Dec. 16, 1941.  J. MERCIER  2,266,691
NONLEAKING DEVICE FOR PISTONS, STUFFING BOXES,
SHOCK ABSORBERS, AND THE LIKE
Filed Nov. 9, 1937  2 Sheets-Sheet 1

Jean Mercier
INVENTOR
By [signature]
his ATTY.

Dec. 16, 1941.  J. MERCIER  2,266,691
NONLEAKING DEVICE FOR PISTONS, STUFFING BOXES,
SHOCK ABSORBERS, AND THE LIKE
Filed Nov. 9, 1937    2 Sheets-Sheet 2

Jean Mercier
INVENTOR
By Otto Munk
his ATTY.

Patented Dec. 16, 1941

2,266,691

UNITED STATES PATENT OFFICE 2,266,691

NONLEAKING DEVICE FOR PISTONS, STUFFING BOXES, SHOCK ABSORBERS, AND THE LIKE

Jean Mercier, Neuilly-sur-Seine, France

Application November 9, 1937, Serial No. 173,590
In France November 17, 1936

3 Claims. (Cl. 309—23)

The present invention relates to an improved non-leaking device for pistons, stuffing-boxes, shock-absorbers, and the like.

In known devices of this class, use is made of packings having the form of rings, of hoops or the like, consisting of leather, of metal, etc. These packings are deformable or elastic, and they are generally placed around the movable part, whereby they are either secured to the movable part itself, or to the space in which the movable part is located.

It has also been proposed in order to increase the non-leaking effect of these packings, to use two packing members of this type. These packings face each other, and form a chamber which is filled with a lubricant.

As long as they are new, these devices ensure satisfactory results, even when relatively high pressures prevail on either side of the joint. Particularly, a perfect initial tightness will be obtained when using packing members of this type provided with elastic annular lips which are recessed upon nearly their whole height, so as to provide at their free ends for a contact band having but a very reduced height, said latter band being adapted to bear with a preliminary elastic pressure against the contact surface. Such lips form the object of applicant's Patent No. 2,157,299, issued May 9, 1939.

The present invention has for its object to obviate all drawbacks and to still very seriously improve the quality of such non-leaking devices. The new device is of the type comprising two packing members which face each other and form between them a chamber containing a lubricant. It is chiefly characterized by the fact that the said chamber is provided with one or more separating walls, screens or the like, dividing it into two or more spaces which are connected together exclusively through one or more channels of a relatively small diameter, the separating wall or walls being so arranged that those parts of the packing which bear against the contact surface (or at least one of these parts) will be constantly surrounded by the lubricant and will never come in contact with the air, the lubricant being maintained at high and preferably constant pressure.

In fact, it has been observed that the defects of the non-leaking action as above set forth, were due to the air which enters the chamber formed by the packing members and collects at the top of this chamber. The presence of this air may cause the two following drawbacks:

1. The air may attain two adjacent parts of the two oppositely-situated lips, this causing a serious decrease of the non-leaking effect. This may happen especially when the non-leaking device is used in the horizontal position.

2. Movement of a piston in a cylinder stirs the lubricant contained in the chamber formed by two packing members and this leads to the formation of an emulsion of air and fluid. In this case as before, the active parts of the packing may get in direct contact with the air contained in the emulsion.

It should be further observed that when non-leaking devices are employed in motors, in compressed air suspensions or the like, in which these devices are subjected to great and rapid variations of pressure, and in which the external pressure is transmitted to the lubricant contained in the non-leaking device, due account should be taken of the fact that the air which is dissolved in the lubricant during the period of compression is released during the period of expansion and has thus the tendency to form an emulsion.

This drawback is entirely avoided by the present invention.

It is thus possible to construct devices which will maintain their good operation and ensure perfect non-leaking conditions for a very long time.

In the accompanying drawing, which is given solely by way of example:

Figure 1:
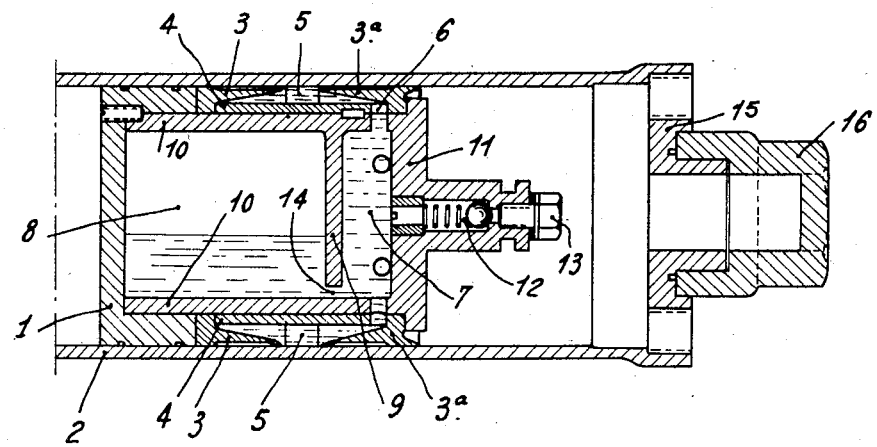
Fig. 1 is a radial section of a non-leaking device according to the invention.

In the embodiment shown in Fig. 1, the device according to the invention is used in a hollow body 1 which is movable inside a cylinder or prism 2. On the outer part of member 1 are mounted two metallic or like packing pieces 3, 3ᵃ, which face each other and are in contact with the wall of cylinder or prism 2. Packing members 3, 3ᵃ, form, with a part of the inner wall of cylinder 2 and with a sleeve 4 situated in movable member 1 an annular space 5 which communicates through one or more channels 6, with the interior of movable body 1. The hollow space inside said body is divided into two chambers by a wall 9 which is integral with or separately secured to the said movable body. In the embodiment represented in Fig. 1, said wall 9 forms part of an internal sleeve 10 which is located in the movable body and serves to support sleeve 4. Space 7 is closed at the outer part by a cap 11 which carries a valve 12 provided with a plug 13 and serves for the filling of the chambers situated inside the movable system.

Space 7 as well as space 5 are entirely filled with a lubricant of any kind. Space 8 communicates with space 7 through one or more orifices or channels 14 of relatively small section, which are formed in the lower part of wall 9. This space 8 is only partly filled, and thus the liquid contained in this space is provided with an air cushion.

When the apparatus is first put in use, a pressure is produced in spaces 5, 7 and 8. This pressure is at least equal to the maximum pressure which can prevail outside the movable system. It should be remarked that the pressure inside the movable system will practically conserve a constant value and will be quite independent of the pressure prevailing outside.

It will be observed that owing to this arrangement, the air enters space 5 thereby impairing the fluid-tightness of packing members 3, 3ᵃ. On the contrary, the fluid will have a tendency to flow outside from space 5, but such a leakage, which is in fact very small, will be naturally compensated by the fluid contained in chamber 8. Such leakage would evidently cause a certain lowering of the level of the liquid in chamber 8, but the resulting reduction of pressure is insignificant. However, care should be taken that the orifices or channels 14 should not be uncovered, and should not get in contact with air.

On the other hand, space 7, and space 5, which communicates with space 7 through orifices 6 of small diameter, are entirely free from air, so that all danger of formation of an emulsion of air and lubricant at a point situated near packing members 3, 3ᵃ, is completely avoided.

The filling, under pressure, of movable system 1 can be readily effected by known means. Fig. 1 shows by way of example, a very easy method of filling by means of valve 12. The apparatus is filled through a disc 15 which is concentric with valve 12 and is normally closed by a plug 16.

Figure 2:
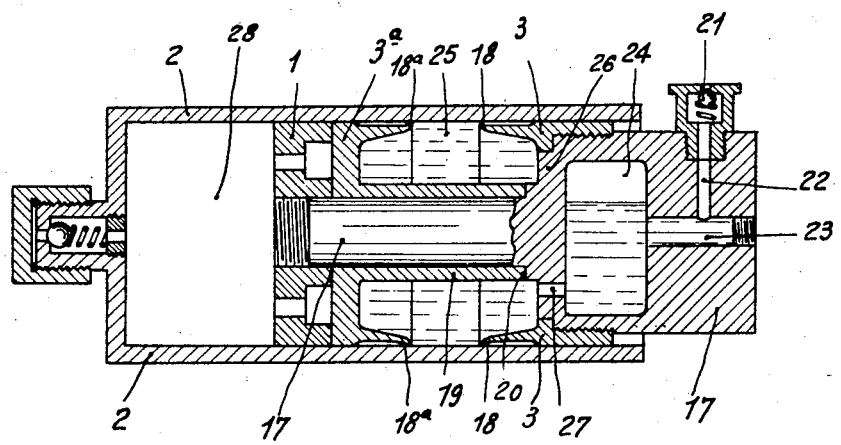
Fig. 2 is a like view of a modification, showing the device according to the invention as applied to the case of a stuffing-box.

In the embodiment shown in Fig. 2, which represents a stuffing-box, a piston 1 provided with a rod 17 is movable in a cylinder 2. A metallic packing member 3, secured to rod 17, is provided with an annular elastic lip having a tapered form, the free edge 18 of which is very thin. This packing has before mounting, a greater diameter than the inner face of cylinder 2. A second metallic packing member 3ᵃ is mounted upon rod 17 and has a very thin edge 18ᵃ which is in elastic contact with the inner surface of the cylinder. A central appendage 19 bears against a shoulder 20 of rod 17. The fluid is admitted through a valve and through conduits 21 and 23 in rod 17. It fills space 24 which is formed in the said appendage of rod 17 and is separated from space 25 located between the two packing members 3, 3ᵃ, by a wall 26 the lower part of which comprises one or more orifices 27 connecting the two spaces 24 and 25.

Space 25 is entirely filled with oil or any other suitable lubricant. Space 24 is only partially filled, and an air cushion is formed above the level of lubricant. The pressure prevailing in space 4 and in chamber 25 must in any case be at least equal to and should be preferably greater than the maximum pressure which may exist in chamber 28 which is situated beyond piston 1.

The pressure of the fluid in spaces 24 and 25 may be adjusted at will, for instance by valve 21.

As in the case of Fig. 1, space 25 is always filled with oil under pressure and is entirely free from air; thus any danger of having after a long use imperfect non-leaking conditions, is obviated, due to the fact that the high pressure prevailing in spaces 24 and 25 remains practically constant.

It is obvious, that spaces 8 (Fig. 1) or 24 (Fig. 2) may occupy any other position, either inside or outside the movable system, provided they will conform to their allotted functions.

The nature of packing members 3 and 3ᵃ is of little importance for the operation of the apparatus according to the invention.

Figure 3:
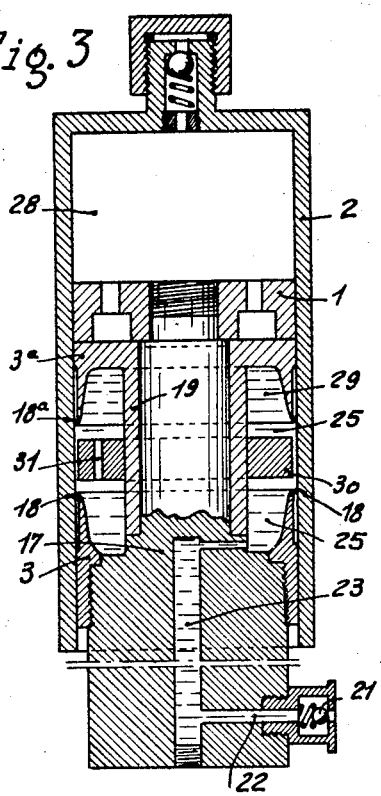
Figs. 3 to 6 are radial sections of other non-leaking devices in conformity with the invention, which are constructed particularly in order to prevent the formation of an emulsion in the lubricant.

Fig. 3 relates to a stuffing-box device wh'ch is analogous to the device shown in Fig. 2, but which is used in the vertical position. In this case, the air which might enter space 25 collects in the annular part 29 located between lip 18ᵃ and appendage 19 of packing member 3ᵃ. Thus the non-leaking conditions will not be affected, provided the level of the liquid will not descend below the contact level of lip 18ᵃ. Should the level of the liquid descend below this level the friction of lip 18ᵃ against the surface of cylinder 2 will produce whirls in the space 25, thus forming an emulsion of air and oil. In order to prevent the formation of such an emulsion, i. e., the air therein contained from affecting the tight working of lip 18, the space surrounding the said lip is separated by a partition or screen 30, from the upper part of the space 25. The said screen may be secured in any suitable manner to appendage 19, or may be integral with the same. It comprises one or more narrow channels 31 which connect the two parts of space 25. The separating wall 30 very slightly bears against the inner surface of cylinder 2, and thus offers no appreciable resistance to the movement of the piston.

Owing to this arrangement, any formation of an emulsion in the space situated above wall 30 is obviated. Practically, the non-leaking conditions of the apparatus remain unchanged, even if the space situated above wall 30 is almost entirely filled with air. In order to increase the effect thus produced, it is feasible, if so desired, to employ two or more superposed screens 30, which are suitably spaced apart.

In this construction, as before, the pressure in the space 25 has a practically constant value, due to the action of device 21—22—23, or the like.

Figure 4:
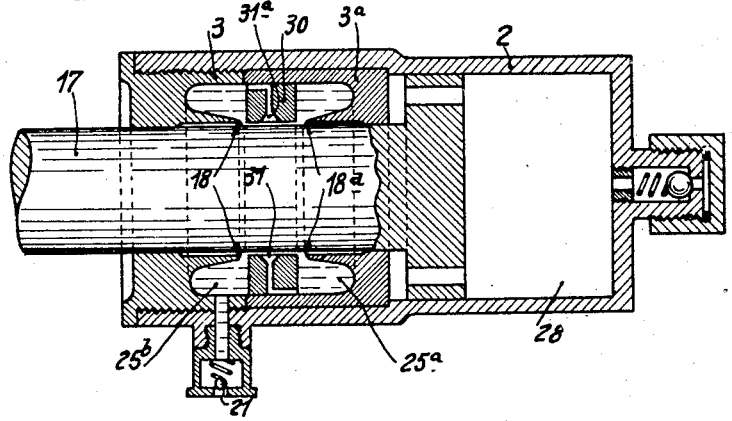

Fig. 4 shows a modified apparatus which is particularly well adapted for use in the horizontal position. The packing members 3, 3ᵃ are stationary, and are in contact with the rod 17 of the piston 1. In this case, the separating wall 30 comprises right-angled channels 31 and 31ᵃ. In this device the air which might have entered spaces 28ᵃ—28ᵇ while proceeding through a point near lips 18—18ᵃ, will necessarily collect in the upper part of these spaces.

As lubricating device 21 maintains the oil pressure at a constant value, air which might enter space 25ᵇ will be expelled through channels 31ᵃ and 31, into space 25ᵃ, and thus only this latter space will now contain air, the space 25ᵇ being entirely free from air. Obviously, the pressure in the space 25 a and b may also be maintained constant by any suitable device, other than the lubricating device 21, and such as a compensating chamber which is shown at 24 in Fig. 2.

Figure 5:
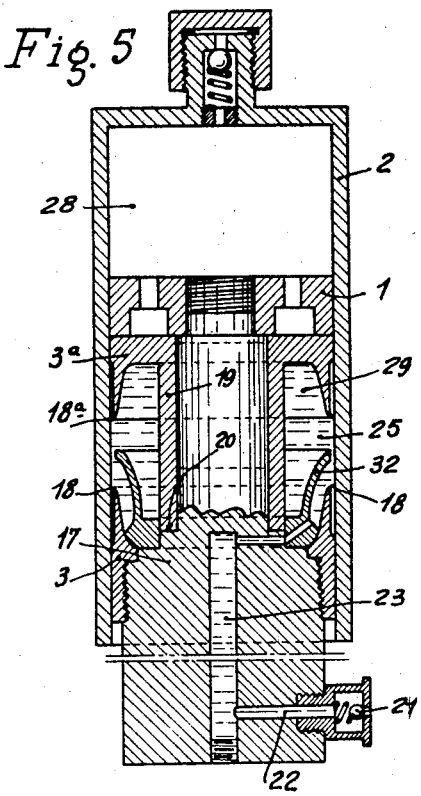

Fig. 5 shows an apparatus which resembles the one shown in Fig. 3, but in which the separation inside space 25 is effected by a wall 32 forming a screen. This screen is mounted on the appendage 17 of the piston, and this prevents the formation of an emulsion in the direct proximity of lips 18 and in the case in which the upper part of the space 25 gets filled with air.

Figure 6:
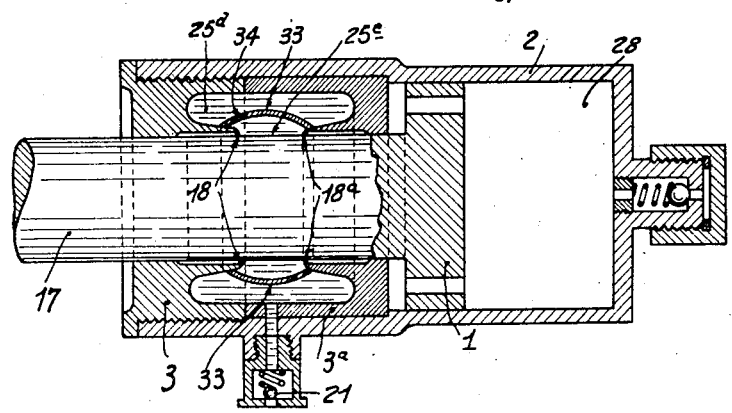

In the apparatus shown in Fig. 6, relating to a stuffing-box resembling the one represented in Fig. 4, the space 25ᶜ which directly surrounds the lips 18 and 18ᵃ of the packing members, is separated from the space 25ᵈ, by an annular screen 33 the edges of which are secured respectively to the outer surfaces of the lips 18, 18ᵃ. This screen is provided with one or more orifices 34 connecting together spaces 25ᶜ and 25ᵈ. In this case, as before, the air entering into the space 25ᶜ is circulated through orifices 34 into the upper part of space 25ᵈ. The screen 33 will also protect space 25ᵈ against the effect produced by the movement of rod 17, and thus from the formation of an emulsion. As in the preceding constructions, the present apparatus may comprise a compensating chamber or a lubricating device, or any other suitable means for maintaining the pressure in spaces 25ᶜ and 25ᵈ at a practically constant value.

Certain devices which have been described may be utilized equally well in the vertical and the horizontal positions, but it should be observed, that in order to obtain a perfect operation, it is necessary to take care that the channels or orifices by which the chambers formed inside the non-leaking apparatus are connected together, should always be immersed in the lubricant, in order to prevent any undue admission of air.

In certain cases, it may be advantageous to recover the air which has circulated through lips 18, 18ᵃ. In such case, it will suffice to connect the spaces formed inside the non-leaking apparatus, and which are subject to an accumulation of air, and with the space containing air which is located outside the said apparatus. Thus in the case of Fig. 2, the upper part of the space 24 may be connected with the space 28 by a conduit proceeding to the exterior or to the interior of the apparatus and provided with a suitable valve, which gives passage to the air but will stop the flow of the lubricant, for instance a valve with capillary orifices, or the like.

In the case of Fig. 3, when the lubricating device 21 is put in operation, a great part of the air which may have entered the space 25 may be driven into the space 28, thus passing around the lips 18ᵃ. This expulsion of air will obviously take place at a relatively slow rate. It might be completed by the provision of a conduit or the like which would connect spaces 28 and 29 together, and would comprise with a valve of the aforesaid type, or the like.

It is evident that such conduits may be employed, if necessary upon all apparatus in conformity with the invention, and may be located at any suitable points. This expulsion of air may be particularly interesting in the case of a compressed air suspension or the like. In this case, it may happen that the pressure in space 28 is reduced below a certain limit. If at this time, the lubricating device 21 is operated, air will be delivered into the space 28, thus restoring the pressure.

Obviously, the devices herein described may be used without any modification, even when a vacuum prevails in the space 28 instead of a high pressure.

It is evident that the invention is not limited to the embodiments herein described and represented, which are given solely by way of example.

Having now described my invention, what I claim as new and desire to secure by Letters Patent is:

1. Packing means for a pneumatic device for use in a predetermined general position and comprising a piston member adapted to work in a cylinder member providing at one side of said means a working chamber which contains air under a variable pressure in direct contact with said means, said means comprising two packing rings secured to one of said members, including resilient tubular flanges turned towards one another, spaced apart from one another and from said one member, adjacent the other member and yieldingly bearing on same with their free end peripheral edges, and confining a space for a lubricant, said one member providing a chamber including said space, and a wall extending through said chamber and forming two compartments therein and providing a restricted passageway, one of said compartments including at least a portion of said space adjacent one packing flange and being filled with lubricant, the other compartment containing air under pressure entrapped in the upper portion thereof and lubricant in the lower portion thereof, said passageway opening into the lubricant-filled portion of the second named compartment, thereby to prevent an emulsion from forming throughout the lubricant in said space, said one member having duct and valve means for initially supplying said chamber therein with lubricant under a pressure at least equal to the maximum pressure in said cylinder chamber.

2. Packing means for a pneumatic device for use in a horizontal position and comprising a piston adapted to work in a cylinder providing at one side of said means a working chamber which contains air at a variable pressure in direct contact with said means, said means comprising two packing rings secured to said pistons, including resilient tubular flanges turned towards one another, spaced apart from one another and from the piston, adjacent said cylinder and yieldingly bearing on same with their free end peripheral edges and confining a space for a lubricant, said piston providing a chamber including said space, and a vertical wall through said chamber, forming two separate compartments therein and providing a restricted passageway, the one of said compartments including said space being filled with lubricant, the other compartment containing air under a desired pressure at least equal to the maximum pressure in said cylinder chamber, entrapped in the upper portion thereof, said passageway opening into the lubricant-filled portion of the second named compartment, thereby to prevent an emulsion from forming in said space, said piston having duct and valve means for initially supplying said chamber therein with lubricant so as to entrap therein air under said desired pressure.

3. Packing means for a pneumatic device for use in a vertical position and comprising a piston adapted to work in a cylinder providing a working chamber above said piston and which contains air at a variable pressure in direct contact with said means, said means comprising two packing rings secured to said piston, including resilient tubular flanges turned towards each other, spaced apart from one another and from the piston, adjacent said cylinder and yieldingly bearing on same with their free end peripheral edges and confining a space for a lubricant, and a wall through said space between said flanges, forming two compartments therein and providing a restricted passageway, the lower compartment being filled with lubricant, the upper compartment being adapted to contain compressed air entrapped in the upper portion thereof and further containing lubricant in the lower portion thereof, said passageway opening into the lubricant-filled portion of the second named compartment, thereby to prevent an emulsion from forming in said space, said piston having duct and valve means for initially supplying said chamber therein with lubricant under a pressure at least equal to the maximum pressure in said cylinder chamber.

JEAN MERCIER.